(No Model.)

J. C. GUNN
EVAPORATOR.

No. 261,447. Patented July 18, 1882.

WITNESSES:
Fred. G. Dieterich.

INVENTOR.
John C. Gunn,
by C. A. Snow & Co.
ATTORNEYS.

N. PETERS, Photo-Lithographer, Washington, D. C.

UNITED STATES PATENT OFFICE.

JOHN C. GUNN, OF KNOXVILLE, TENNESSEE.

EVAPORATOR.

SPECIFICATION forming part of Letters Patent No. 261,447, dated July 18, 1882.

Application filed June 3, 1882. (No model.)

*To all whom it may concern:*

Be it known that I, JOHN C. GUNN, of Knoxville, in the county of Knox and State of Tennessee, have invented certain new and useful Improvements in Evaporators; and I do hereby declare that the following is a full, clear, and exact description of the invention, which will enable others skilled in the art to which it appertains to make and use the same, reference being had to the accompanying drawings, which form a part of this specification.

This invention relates to sugar and molasses evaporators; and it consists in certain improvements in the construction of the same, whereby a convenient, durable, inexpensive, and portable machine is produced, as will be hereinafter more fully described with reference to the drawings, in which—

Figure 1:
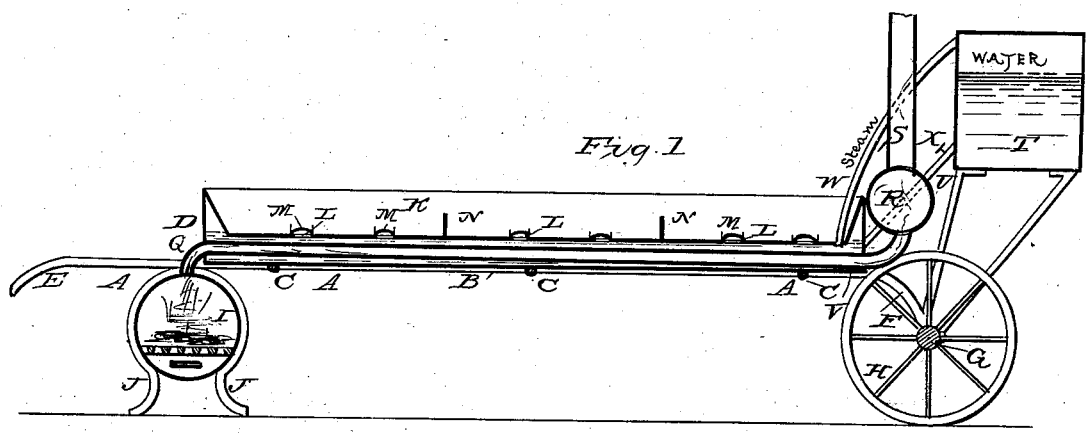
Figure 2:
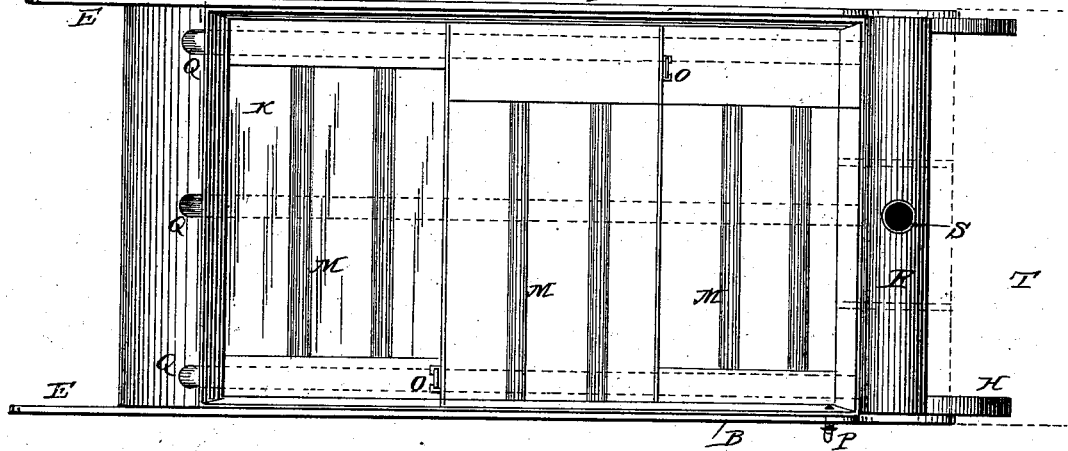

Figure 1 is a longitudinal vertical section. Fig. 2 is a plan view.

Like letters refer to like parts.

A represents a barrow truck or frame constructed preferably of wrought-iron pipe—such as gas-pipe—or of suitable bars or rods, the sides of which frame, B, are connected by strips C, serving to support a large shallow pan, D, which forms the bed of the truck. The sides B are extended in front, so as to form handles E, and they are provided at the rear end of the truck with brackets F, having bearings for the axle G, upon which wheels H are mounted.

I is a cylindrical fire-box, arranged transversely under the front end of frame A, and having legs J, serving as supports for said fire-box and for the front end of the truck.

K is the evaporating-pan, which is set in the pan D, the upper edges of the two pans being secured together tightly to prevent escape of steam. The sides of pan K are inclined, as shown, so that said pan may be entirely surrounded by steam or hot water.

The bottom of pan K is provided with several transverse rows or series of perforations, L, over which half-round pipes M are secured, as shown, by soldering or otherwise. By this construction the sirup may be heated very thoroughly and quickly.

Pan K is also provided with several partitions, N, having gates O, suitably arranged.

A suitably-located try-cock, P, is provided.

Q Q are smoke pipes or flues running from the fire-box I, longitudinally through the pan D, under the bottom of pan K, a space of an inch or more being left above and below said flues.

The flues Q convey the products of combustion to a smoke-cylinder, R, at the rear end of the frame, from whence they escape through a stack or pipe, S.

T is a water-tank suitably arranged at the rear end of the frame, above the smoke-cylinder, and connected by a pipe, U, with the water-space V between the pans D K. The top of said space is also connected with the top of tank T by a steam-pipe, W.

Pipe U has a cock, X, for controlling the flow of water.

The operation of my invention will be readily understood. The water in space V is heated, thus boiling and evaporating the contents of pan K without danger of burning. The steam passes through pipe W into tank T, the contents of which are thus heated before being discharged into the water-space V.

The device, being mounted on wheels, may be readily moved to any place where it may be wanted.

The water-tank may be dispensed with and the contents of the evaporating-pan boiled by hot air simply.

Having thus described my invention, I claim—

1. The combination of the pans D K, fire-box I, flues Q, and the smoke cylinder and stack, as set forth.

2. The pan D, forming the bed of a barrow or truck, in combination with the evaporating-pan K and means for heating water in the space between said pans, as set forth.

3. The combination of the truck-frame A, mounted on wheels, as shown, pan D, fire-box I, having legs J, evaporating-pan K, flues Q, the smoke box and stack, the tank T, and the pipes U W, as and for the purpose set forth.

4. The combination of the pan D, pan K, having perforations L and covering-pipes M, and means for heating water between said pans, as set forth.

In testimony that I claim the foregoing as my own I have hereto affixed my signature in presence of two witnesses.

JOHN C. GUNN.

Witnesses:
W. C. ROGAN,
J. A. McDANNEL.